(12) United States Patent
Seok et al.

(10) Patent No.: US 12,058,450 B2
(45) Date of Patent: Aug. 6, 2024

(54) ELECTRONIC DEVICE WHICH ADJUSTS WHITE BALANCE OF IMAGE ACCORDING TO ATTRIBUTES OF OBJECT IN IMAGE AND METHOD FOR PROCESSING IMAGE BY ELECTRONIC DEVICE

(71) Applicant: Samsung Electronics Co., Ltd., Suwon-si (KR)

(72) Inventors: Jinkeun Seok, Suwon-si (KR); Dongo Kim, Suwon-si (KR); Saetek Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 17/250,592

(22) PCT Filed: Aug. 7, 2019

(86) PCT No.: PCT/KR2019/009897
§ 371 (c)(1),
(2) Date: Feb. 5, 2021

(87) PCT Pub. No.: WO2020/032585
PCT Pub. Date: Feb. 13, 2020

(65) Prior Publication Data
US 2021/0321069 A1 Oct. 14, 2021

(30) Foreign Application Priority Data
Aug. 8, 2018 (KR) .......................... 10-2018-0092662

(51) Int. Cl.
*G06K 9/00* (2022.01)
*G06T 5/50* (2006.01)
(Continued)

(52) U.S. Cl.
CPC .............. *H04N 23/88* (2023.01); *G06T 5/50* (2013.01); *H04N 9/646* (2013.01); *G06T 2207/20224* (2013.01)

(58) Field of Classification Search
CPC .......... H04N 23/88; H04N 9/646; H04N 9/73; G06T 5/50; G06T 2207/20224; G06T 5/009; G06T 5/001
See application file for complete search history.

(56) References Cited

U.S. PATENT DOCUMENTS 8,958,638 B2  2/2015  Webb et al.
2006/0066912 A1* 3/2006  Kagaya ................. H04N 1/628
                                        358/302
(Continued)

FOREIGN PATENT DOCUMENTS

JP  2006-222928 A  8/2006
JP  2008-117221 A  5/2008
(Continued)

OTHER PUBLICATIONS

Trusty, Lyle. "Landscape photography." PSA Journal 75.10 (2009): 32-35. (Year: 2009).*
(Continued)

*Primary Examiner* — Andrew M Moyer (57) ABSTRACT

According to various embodiment, an electronic device for adjusting the white balance of an image according to an attribute of an object included in the image comprises an image sensor, a display and a processor configured to be electrically connected to the image sensor and the display, wherein the processor is configured to: obtain an image of an external object using the image sensor, adjust the image into a first adjusted image by performing white balance on the image, identify whether the image or the first adjusted image comprises at least one figure, display the first adjusted image as the image of the external object on the display when
(Continued)

identifying that the image or the first adjusted image does not comprise the at least one figure and adjust the first adjusted image into a second adjusted image by performing specified color balance on the first adjusted image and display the second adjusted image as the image of the external object on the display when it is identified that the image or the first adjusted image comprises the at least one figure and a color temperature of the first adjusted image satisfies a determination range for adjusting specified color balance.

10 Claims, 8 Drawing Sheets

(51) Int. Cl.
    *H04N 9/64*     (2023.01)
    *H04N 23/88*     (2023.01)

(56) References Cited

U.S. PATENT DOCUMENTS

| | | |
|---|---|---|
| 2006/0284991 A1 | 12/2006 | Keda |
| 2008/0152228 A1* | 6/2008 | Tokuse ............... H04N 1/62 |
| | | 382/190 |
| 2009/0041347 A1 | 2/2009 | Iguchi et al. |
| 2010/0259639 A1 | 10/2010 | Hung et al. |
| 2011/0216160 A1* | 9/2011 | Martin ............... G03H 1/2249 |
| | | 348/E13.001 |
| 2012/0218439 A1 | 8/2012 | Jeda et al. |

FOREIGN PATENT DOCUMENTS

| | | |
|---|---|---|
| JP | 2009-044681 A | 2/2009 |
| JP | 2010-157873 A | 7/2010 |
| JP | 2012-178788 A | 9/2012 |
| KR | 10-2006-0133487 A | 12/2006 |

OTHER PUBLICATIONS

Office Action dated Dec. 30, 2022 in connection with Korean Patent Application No. 10-2018-0092662, 12 pages.

International Search Report and Written Opinion of the International Searching Authority in connection with International Application No. PCT/KR2019/009897 dated Nov. 13, 2019, 11 pages.

* cited by examiner

ELECTRONIC DEVICE WHICH ADJUSTS WHITE BALANCE OF IMAGE ACCORDING TO ATTRIBUTES OF OBJECT IN IMAGE AND METHOD FOR PROCESSING IMAGE BY ELECTRONIC DEVICE

CROSS-REFERENCE TO RELATED APPLICATIONS

This application is a 371 National Stage of International Application No. PCT/KR2019/009897, filed Aug. 7, 2019, which claims priority to Korean Patent Application No. 10-2018-0092662, filed Aug. 8, 2018, the disclosures of which are herein incorporated by reference in their entirety.

BACKGROUND

1. Field

The disclosure relates to an electronic device for adjusting the white balance of an image according to an attribute of an object included in the image and a method for processing an image by an electronic device.

2. Description of Related Art

A digital camera may use an image sensor so as to convert light into an electric signal, thereby producing an image, and may correct the produced image by using an image signal processor. For example, a white balance for providing accurate colors regarding a reproduced image refers to a process of adjusting the color temperature of light such that ideal white color is captured, and adjusting gains regarding red, green, and blue components with reference to a white point.

Recent electronic devices having digital cameras or other cameras are provided with an auto white balance (AWB) function such that the color temperature and color impression are automatically adjusted. The gains of color components are identically adjusted unilaterally regardless of the overall color temperature of the image, and thus are adjusted unilaterally regardless of the user's satisfaction. For example, if the white balance function is identically applied to an image including a figure and to another image including no figure, the color change in each image varies.

SUMMARY

In the case of an image including a figure, the automatic white balance function may adjust the same to a color temperature that gives a cold feeing. As a result, the reduced contrast may decrease the user's satisfaction.

Various embodiments seek to provide a method for processing an image by an electronic device, wherein an image including a figure is adjusted to a color temperature that gives a warm feeling, thereby increasing the contrast and the user's satisfaction.

According to various an electronic device for adjusting the white balance of an image according to an attribute of an object included in the image comprises an image sensor, a display and a processor configured to be electrically connected to the image sensor and the display, wherein the processor is configured to: obtain an image of an external object using the image sensor, adjust the image into a first adjusted image by performing white balance on the image, identify whether the image or the first adjusted image comprises at least one figure, display the first adjusted image as the image of the external object on the display when identifying that the image or the first adjusted image does not comprise the at least one figure and adjust the first adjusted image into a second adjusted image by performing specified color balance on the first adjusted image and display the second adjusted image as the image of the external object on the display when it is identified that the image or the first adjusted image comprises the at least one figure and a color temperature of the first adjusted image satisfies a determination range for adjusting specified color balance.

According to various an electronic device for adjusting the white balance of an image according to an attribute of an object included in the image comprises an image sensor, a display and a processor configured to be electrically connected to the image sensor and the display, wherein the processor is configured to: obtain an image of an external object from an image sensor, adjust the image into a first adjusted image by performing white balance on the image, identify whether the image or the first adjusted image comprises at least one figure, display the first adjusted image as the image of the external object on the display when identifying that the first adjusted image does not comprise the at least one figure, determine whether it is identified that the image or the first adjusted image comprises the at least one figure and whether a color temperature of the first adjusted image satisfies a determination range for adjusting specified color balance, adjust the first adjusted image, which comprises the at least one figure and satisfies the determination range, into a second adjusted image by performing specified color balance on the first adjusted image; and display the second adjusted image as the image of the external object on the display.

According to various embodiments of the disclosure, in the case of a background picture, only white balance is performed to increase the color definition. In the case of a picture of a figure picture, on the other hand, the same is adjusted by using balance of color series other than the white balance, thereby increasing the warm feeling and the user's satisfaction.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
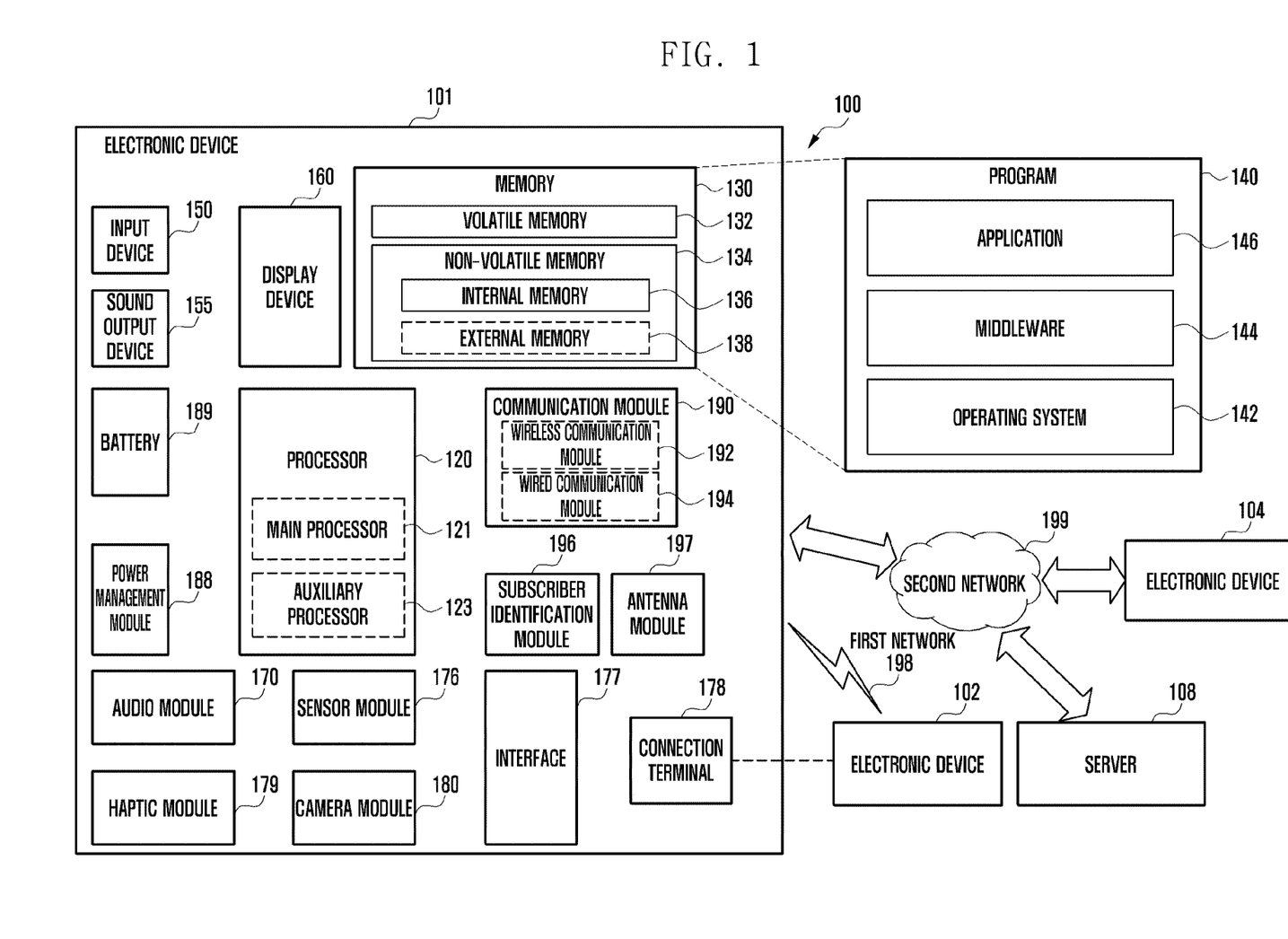
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The camera module 180 may capture a still image or moving images. According to an embodiment, the camera module 180 may include one or more lenses, image sensors, image signal processors, or flashes.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

According to an embodiment, processor 120 may control to obtain an image of an external object using the image sensor, adjust the image into a first adjusted image adjust the image into a first adjusted image by performing white balance on the image, identify whether the image or the first adjusted image comprises at least one figure, display the first adjusted image as the image of the external object on the display when identifying that the image or the first adjusted image does not comprise the at least one figure and adjust the first adjusted image into a second adjusted image by performing specified color balance on the first adjusted image and display the second adjusted image as the image of the external object on the display when it is identified that the image or the first adjusted image comprises the at least one figure and a color temperature of the first adjusted image satisfies a determination range for adjusting specified color balance.

According to an embodiment, processor 120 may control to obtain an image of an external object from an image sensor, adjust the image into a first adjusted image by performing white balance on the image, identify whether the image or the first adjusted image comprises at least one figure, display the first adjusted image as the image of the external object on the display when identifying that the first adjusted image does not comprise the at least one figure, determine whether it is identified that the image or the first adjusted image comprises the at least one figure and whether a color temperature of the first adjusted image satisfies a determination range for adjusting specified color balance, adjust the first adjusted image, which comprises the at least one figure and satisfies the determination range, into a second adjusted image by performing specified color balance on the first adjusted image; and display the second adjusted image as the image of the external object on the display.

Figure 2:
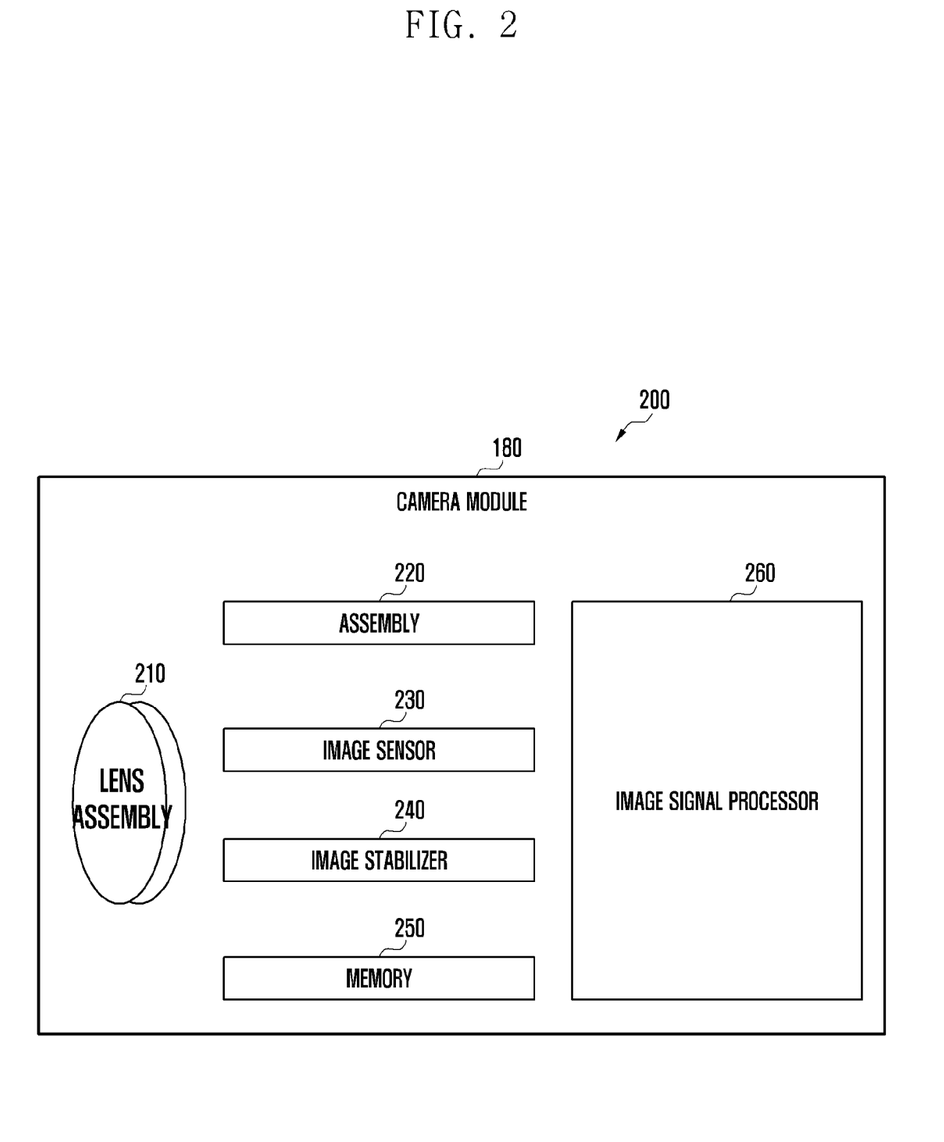
FIG. 2 is a block diagram 200 illustrating the camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

According to an embodiment, an image signal processor 260 may control to obtain an image of an external object using the image sensor, adjust the image into a first adjusted image adjust the image into a first adjusted image by performing white balance on the image, identify whether the image or the first adjusted image comprises at least one figure, display the first adjusted image as the image of the external object on the display when identifying that the image or the first adjusted image does not comprise the at least one figure and adjust the first adjusted image into a second adjusted image by performing specified color balance on the first adjusted image and display the second adjusted image as the image of the external object on the display when it is identified that the image or the first adjusted image comprises the at least one figure and a color temperature of the first adjusted image satisfies a determination range for adjusting specified color balance.

According to an embodiment, an image signal processor 260 may control to obtain an image of an external object from an image sensor, adjust the image into a first adjusted image by performing white balance on the image, identify whether the image or the first adjusted image comprises at least one figure, display the first adjusted image as the image of the external object on the display when identifying that the first adjusted image does not comprise the at least one figure, determine whether it is identified that the image or the first adjusted image comprises the at least one figure and whether a color temperature of the first adjusted image satisfies a determination range for adjusting specified color balance, adjust the first adjusted image, which comprises the at least one figure and satisfies the determination range, into a second adjusted image by performing specified color balance on the first adjusted image; and display the second adjusted image as the image of the external object on the display.

Figure 3:
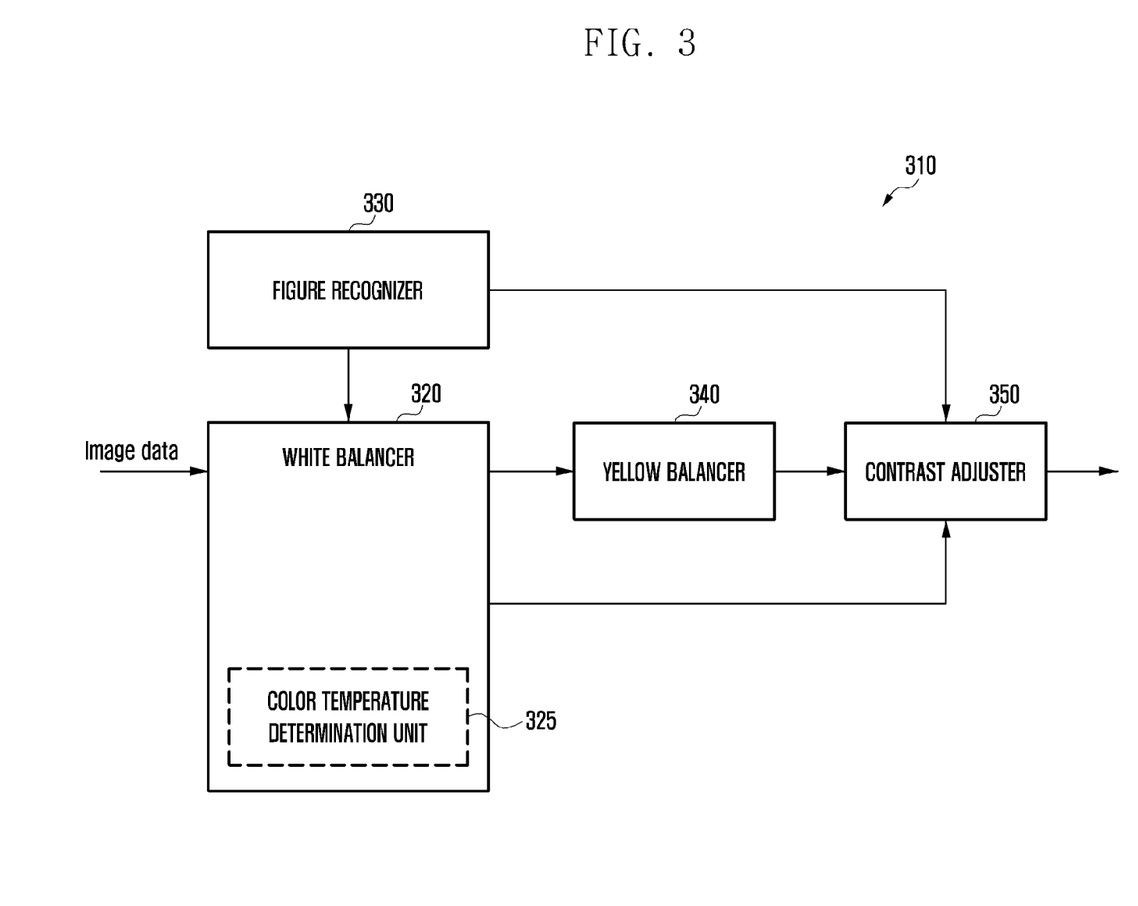
FIG. 3 is a block diagram illustrating some components of an image signal processor according to various embodiments.

FIG. 3 is a block diagram illustrating some components of an image signal processor according to various embodiments.

Referring to FIG. 3, the image signal processor 310 (e.g., the processor 120 of FIG. 1 or the image signal processor 260 of FIG. 2) according to various embodiments may include a white balancer 320, a figure recognizer 330, a yellow balancer 340, and a contrast adjuster 350.

The white balancer 320 may further include a color temperature determination unit 325. According to various embodiments, the color temperature determination unit 325 may be included in the yellow balancer 340 or may be configured independently from the white balancer 320.

The white balancer 320 may receive an image captured by an image sensor (e.g., the image sensor 230 of FIG. 2) and may perform a white balance function on the received image. According to an embodiment, the white balancer 320 may perform automatic white balance according to a setting at the time of manufacture or preset white balance according to an option set by a user.

According to an embodiment, the white balancer 320 may estimate reference white for red, green, and blue (RGB) values from the received image, may calculate a color gain for adjusting individual color information for distorted white, and may adjust the calculated color gain, thereby adjusting the white balance of the image so that accurate white is represented. For example, the white balancer 320 may estimate each of maximum red, green, and blue (RGB) values in the image as reference white or may determine average RGB values of the image as gray and may estimate reference white using gray but is not limited thereto.

Here, the image adjusted by white balance may be referred to as a first adjusted image.

The white balancer 320 may transmit the image adjusted by the white balance to the figure recognizer 330.

The figure recognizer 330 may determine whether a figure is recognized in the image adjusted by the white balance, may provide a recognition result to the white balancer 320 when a figure is recognized, and may transmit the image adjusted by the white balance to the contrast adjuster 350 when a figure is not recognized.

According to an embodiment, the figure recognizer 330 may recognize whether a figure (or a human) is included in the image based on at least one of face recognition, human shape recognition, and object recognition in the image. For example, when a face is detected in the image, the figure recognizer 330 may identify that a figure is included. When no face is detected in the image, the figure recognizer 330 may determine whether a human shape is detected in the image through edge detection. For example, the figure recognizer 330 may determine whether extracted edge information matches a human shape database storing the outline of a human, thereby determining whether there is a human in the image. Alternatively, the figure recognizer 330 may identify a specific object (e.g., a hat or a watch) in a human shape area of the image and may compare external image feature information for identifying a human, such as clothing color, hair length, hair color, bag color, or a pattern, other than a face through template matching, thereby determining whether there is a human in the image.

The color temperature determination unit 325 of the white balancer 320 may determine the color temperature of the image adjusted by the white balance when a figure is recognized in the image adjusted by the white balance.

For example, the color temperature determination unit 325 may estimate the overall color temperature of the image using average RGB values of all pixels in the image and a color temperature conversion algorithm.

In another example, the color temperature determination unit 325 may convert RGB values of each pixel in the image into color space coordinate information, may calculate a total yellow count by combining the number of pixels in a yellow group, the number of pixels in a blue group, and a weighting according to saturation based on the color space coordinate information about each pixel, and may estimate the color temperature based on the total yellow count. A configuration for estimating the color temperature based on the total yellow count will be described in detail with reference to FIG. 5. For example, the color space coordinate information may be information based on at least one of coordinates of an HSL color space in which H denotes hue, S denotes saturation, and L denotes lightness, coordinates of a XYZ color space in which a color is represented by three-dimensional coordinates, and coordinates of a YUV color space in which a Y-axis denotes a luma component and a color is represented using U- and V-axes.

The color temperature determination unit 325 may identify whether the color temperature of the image adjusted by the white balance falls within a determination range for yellow balance adjustment. When the color temperature falls within the determination range set for yellow balance adjustment, the color temperature determination unit 325 may transmit the image adjusted by the white balance to the yellow balancer 340, and when the color temperature does not fall within the determination range set for yellow balance adjustment, the color temperature determination unit 325 may transmit the image adjusted by the white balance to the contrast adjuster 350. For example, the determination range set for performing yellow balance may be a range of the overall color temperature of the image from about 3500 to 5000 K but is not limited thereto.

The yellow balancer 340 may perform yellow balance on the image adjusted by the white balance when the image adjusted by the white balance includes a figure and the color temperature of the image adjusted by the white balance falls within the determination range set for yellow balance adjustment.

According to an embodiment, the yellow balancer 340 may calculate a yellow color gain for adjusting individual color information for the image adjusted by the white balance and may adjust the yellow balance of the image based on the calculated color gain so that the image is represented in a yellow tone. For example, the yellow balancer 340 may convert the total yellow count calculated by the color temperature determination unit 325 into an interpolation value for a color and may calculate the color gain for adjusting individual color information based on the interpolation value.

Here, an image obtained by adjusting the image adjusted by the white balance with the yellow balance may be referred to as a second adjusted image.

The yellow balancer 340 may transmit the image adjusted by the yellow balance (or second adjusted image) to the contrast adjuster 350.

The contrast adjuster 350 may adjust the contrast of an image transmitted from at least one of the white balancer 320, the figure recognizer 330, and the yellow balancer 340. The contrast adjuster 350 may increase the contrast of the entire image or may increase the contrast of a specific area, thereby improving the definition of the image.

An electronic device (e.g., 101 of FIG. 1) according to various embodiments may include: an image sensor (e.g., the camera module 180 of FIG. 1 or the image sensor 230 of FIG. 2); a display (e.g., the display device 160 of FIG. 1); and a processor (e.g., the processor 120 of FIG. 1, the image signal processor 260 of FIG. 2, or the image signal processor 310 of FIG. 3) configured to be electrically connected to the image sensor and the display, wherein the processor 120, 260, or 310 may be configured to: obtain an image of an external object using the image sensor; adjust the image into a first adjusted image by performing white balance on the image; identify whether the image or the first adjusted image includes at least one figure; display the first adjusted image as the image of the external object on the display when identifying that the image or the first adjusted image does not include the at least one figure; and adjust the first adjusted image into a second adjusted image by performing specified color balance on the first adjusted image and display the second adjusted image as the image of the external object on the display when it is identified that the image or the first adjusted image includes the at least one figure and a color temperature of the first adjusted image satisfies a determination range for adjusting specified color balance.

The electronic device may further include a memory (e.g., the memory 130 of FIG. 1 or the memory 250 of FIG. 2), wherein the processor may be configured to store the first adjusted image as the image of the external object in the memory when it is identified that the image or the first adjusted image does not include the figure, and to store the second adjusted image as the image of the external object in the memory when it is identified that the image or the first adjusted image includes the figure.

The determination range for adjusting the specified color balance may include a range set for performing yellow balance, and the processor may be configured to perform the yellow balance as at least part of performing the specified color balance.

The range set for performing the yellow balance may fall in an average color temperature of the image ranging from 3500 to 5000 K.

In the electronic device, the processor may be configured to estimate the color temperature of the first adjusted image using average RGB values of all pixels included in the first adjusted image and a color temperature conversion algorithm.

In the electronic device, the processor may be configured to: calculate a total first color count by converting red, green, and blue (RGB) values of each pixel in the first adjusted image into color space coordinate information and subtracting a sum of a number of pixels and a weighting included in a second color range from a sum of a number of pixels and a weighting included in a first color range based on the color space coordinate information about each pixel; and estimate the color temperature of the first adjusted image based on the calculated total first color count.

In the electronic device, when the total first color count is greater than a minimum threshold value as a criterion for determining whether to perform first color balance, the processor may be configured to perform the specified color balance on the first adjusted image.

In the electronic device, the processor may be configured to: generate the second adjusted image by converting the total first color count into an interpolation value corresponding to a first color, obtaining a gain for adjusting individual color information for performing first color balance based on the interpolation value, and performing the first color balance based on the obtained gain when the total first color count is greater than the minimum threshold value; and obtain the gain using an interpolation value corresponding to a maximum threshold value as a criterion for determining maximum processing of the first color balance when the total first color count is equal to or greater than the maximum threshold value.

The first color range may be set to a range of yellow colors, the second color range may be set to a range of blue colors, and the weighting may vary depending on the saturation of a color.

In the electronic device, when the image or the first adjusted image does not include the figure or when the image or the first adjusted image includes the figure and the color temperature of the first adjusted image does not fall in the determination range, the processor may be configured to perform contrast adjustment on the first adjusted image or to perform contrast adjustment on the second adjusted image resulting from the specified color balance.

The processor may be an image signal processor.

An electronic device (e.g., the electronic device 101 of FIG. 1) according to various embodiments may include: an image sensor (e.g., the camera module 180 of FIG. 1 or the image sensor 230 of FIG. 2); a memory (e.g., the memory 130 of FIG. 1 or the memory 250 of FIG. 2); and a processor (e.g., the processor 120 of FIG. 1, the image signal processor 260 of FIG. 2, or the image signal processor 310 of FIG. 3) configured to be electrically connected to the image sensor and the memory, wherein the processor may be configured to: receive an image of an external object from the image sensor; perform white balance on the image; store the image adjusted by the white balance as the image of the external object in the memory when at least one figure is not identified in the image or the image adjusted by the white balance; determine whether a color temperature of the image adjusted by the white balance falls within a determination range set for adjusting first color balance when the at least one figure is identified in the image or the image adjusted by the white balance; store the image adjusted by the white balance as the image of the external object in the memory when the color temperature of the image adjusted by the white balance does not fall within the determination range; perform the first color balance on the image adjusted by the white balance when the at least one figure is identified in the image or the image adjusted by the white balance and the color temperature of the image adjusted by the white balance falls within the determination range; and store the image adjusted by the first color balance as the image of the external object in the memory.

The electronic device may further include a display (e.g., the display device 160 of FIG. 1), wherein the processor may be configured to display an image obtained by adjusting a next frame of the image received from the image sensor with the white balance as the image of the external object on the display or to display the image adjusted by the first color balance as the image of the external object on the display based on whether the figure is identified and the range of the color temperature.

A first color may be a range of yellow colors, and the set range may be a color temperature ranging from 3500 to 5000 K.

In the electronic device, the processor may be configured to: calculate a total first color count by converting red, green, and blue (RGB) values of each pixel in the image adjusted by the white balance into color space coordinate information and subtracting a sum of a number of pixels and a weighting included in a second color range from a sum of a number of pixels and a weighting included in a first color range based on the color space coordinate information about each pixel; and identify whether the calculated total first color count falls within the set range.

In the electronic device, when the total first color count is greater than a minimum threshold value as a criterion for determining maximum processing of the first color balance, the processor may be configured to generate a second adjusted image by converting the total first color count into an interpolation value corresponding to the first color, obtaining a gain for adjusting individual color information for performing the first color balance based on the interpolation value, and performing the first color balance based on the obtained gain When the total first color count is greater than a second threshold value as a criterion for determining maximum processing of the first color balance, the electronic device may be configured to use an interpolation value corresponding to the second threshold value.

The first color and a second color may be set to complementary colors.

The first color may include a range of yellow colors, the second color may include a range of blue colors, and the weighting may vary depending on the saturation of a color.

In the electronic device, the processor may be configured to: perform contrast adjustment on the image adjusted by the white balance when the figure is not identified in the image or the image adjusted by the white balance or when the figure is identified in the image or the image adjusted by the white balance and the color temperature of the image adjusted by the white balance does not fall within the determination range; and perform contrast adjustment on the image adjusted by the first color balance when the figure is identified in the image or the image adjusted by the white balance and the color temperature of the image adjusted by the white balance falls within the determination range.

Figure 4:
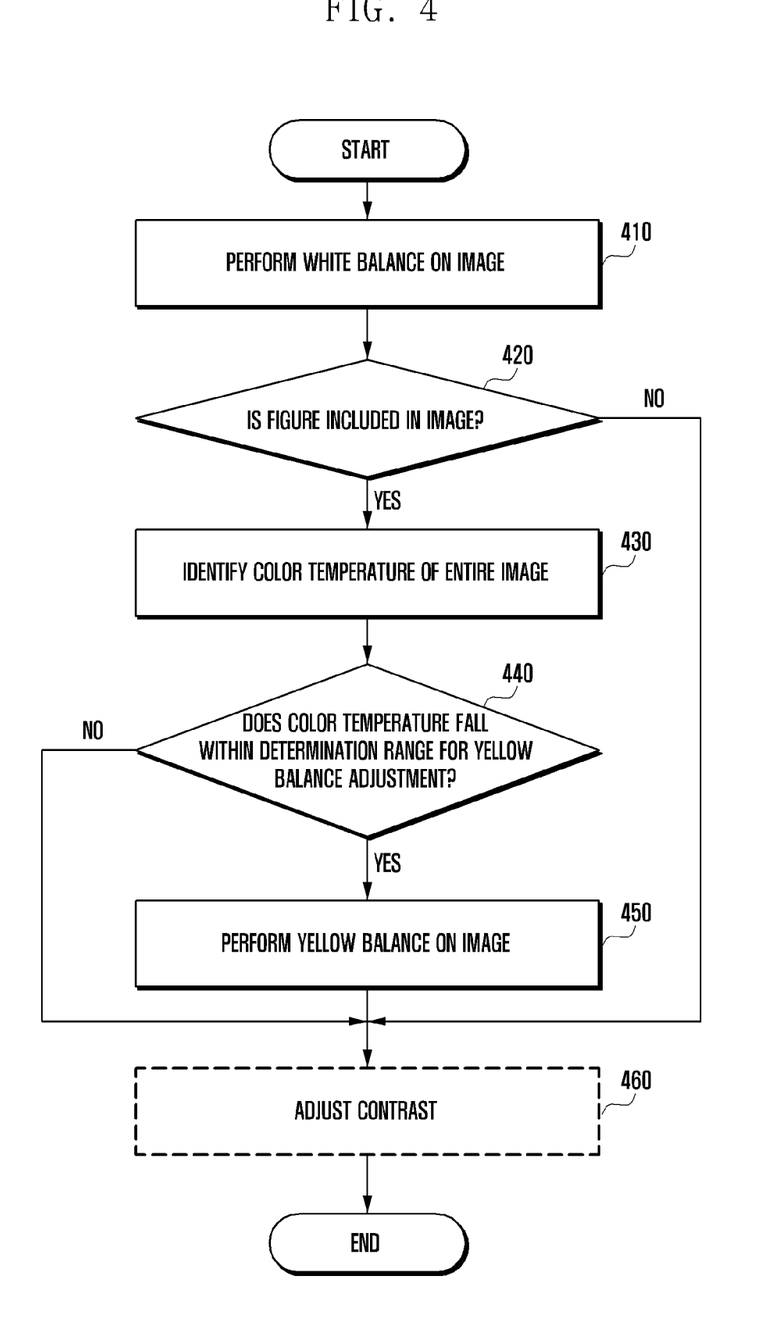
FIG. 4 illustrates an image processing method of an electronic device according to various embodiments.

FIG. 4 illustrates an image processing method of an electronic device according to various embodiments.

Referring to FIG. 4, in operation 410, a processor (e.g., the processor 120 of FIG. 1, the image signal processor 260 of FIG. 2, or the image signal processor 310 of FIG. 3) of an electronic device according to various embodiments may perform white balance on an image obtained from an image sensor. For example, the processor may estimate reference white for red, green, and blue (RGB) values from the received image (or image frame), may calculate a color gain for adjusting individual color information for distorted white, and may adjust the calculated color gain, thereby adjusting the white balance of the image so that accurate white is represented.

Here, the image adjusted by white balance may be referred to as a first adjusted image.

In operation 420, the processor may identify whether a figure is included in the image adjusted by the white balance.

The processor according to an embodiment may recognize whether a figure (or a human) is included in the image based on at least one of face recognition, human shape recognition, and object recognition in the image. For example, when a face is detected in the image, the processor may recognize a figure. In another example, when edge information extracted from the image matches a human shape database storing the outline of a human or a specific object (e.g., a hat or a watch) in a human shape area matches external image feature information for identifying a human, such as clothing color, hair length, hair color, bag color, or a pattern, other than a face, the processor may determine that there is a human in the image.

When a figure is included in the image adjusted by the white balance, the processor performs operation 430, and when no figure is included, the processor may adjust the contrast of the image adjusted by the white balance in operation 460.

The processor identify the color temperature range of the image adjusted by the white balance in operation 430 and may determine whether the identified color temperature range of the image falls within a determination range for yellow balance adjustment in operation 440. For example, the determination range for yellow balance adjustment may be a range from about 3500 to 5000 K but is not limited thereto. The determination range for yellow balance adjustment may vary depending on the color of a light source detected by an illuminance sensor when image data is received from the image sensor.

According to an embodiment, the processor may estimate the color temperature of the image adjusted by the white balance. For example, the processor may estimate the color temperature of the image using average RGB values of all pixels in the image and a color temperature conversion algorithm.

According to another embodiment, the processor may convert RGB values of each pixel in the image into color space coordinate information and may estimate the color temperature based on the color space coordinate information. The color space coordinate information may be information indicating color, brightness, and saturation in spatial coordinates. The color space coordinate information may be information based on at least one of coordinates of an HSL color space in which H denotes hue, S denotes saturation, and L denotes lightness, coordinates of a XYZ color space in which a color is represented by three-dimensional coordinates, and coordinates of a YUV color space in which a Y-axis denotes a luma component and a color is represented using U- and V-axes.

According to an embodiment, the processor may convert the RGB values of each pixel in the image into color space coordinate information numerically representing the RGB values of each pixel and may extract pixels included in a yellow group and pixels included in a blue group based on the color space coordinate information about each pixel. The processor may calculate a total yellow count by combining the number of pixels in a yellow group, the number of pixels in a blue group, and a weighting according to saturation. The processor may estimate the color temperature based on the total yellow count.

When the color temperature of the image adjusted by the white balance falls within the determination range for yellow balance adjustment, the processor may perform yellow balance on the image in operation 450, and when the color temperature of the image adjusted by the white balance does not fall within the range for yellow balance adjustment, the processor may adjust the contrast of the image adjusted by the white balance in operation 460.

In operation 450, the processor may perform yellow balance on the image adjusted by the white balance.

According to an embodiment, the processor may obtain a yellow color gain for adjusting individual color information for the image adjusted by the yellow balance and may adjust the yellow balance of the image based on the yellow color gain so that the image is represented in a yellow tone. Here, an image obtained by adjusting the image adjusted by the white balance with the yellow balance may be referred to as a second adjusted image.

In operation 460, the processor may adjust the contrast of the image adjusted by the white balance or the image adjusted by the yellow balance.

Although not shown in the drawing, after adjusting the contrast in operation 460, the processor may display the image with the adjusted contrast on a display (e.g., the display device 160 of FIG. 1) or may store the image with the adjusted contrast in a memory (e.g., the memory 130 of FIG. 1 or the memory 250 of FIG. 2). According to an embodiment, operation 460 may be omitted from the image processing method of the electronic device.

Hereinafter, a specific method for estimating the color temperature of an image based on color space coordinate information and adjusting the yellow balance will be described.

Figure 5:
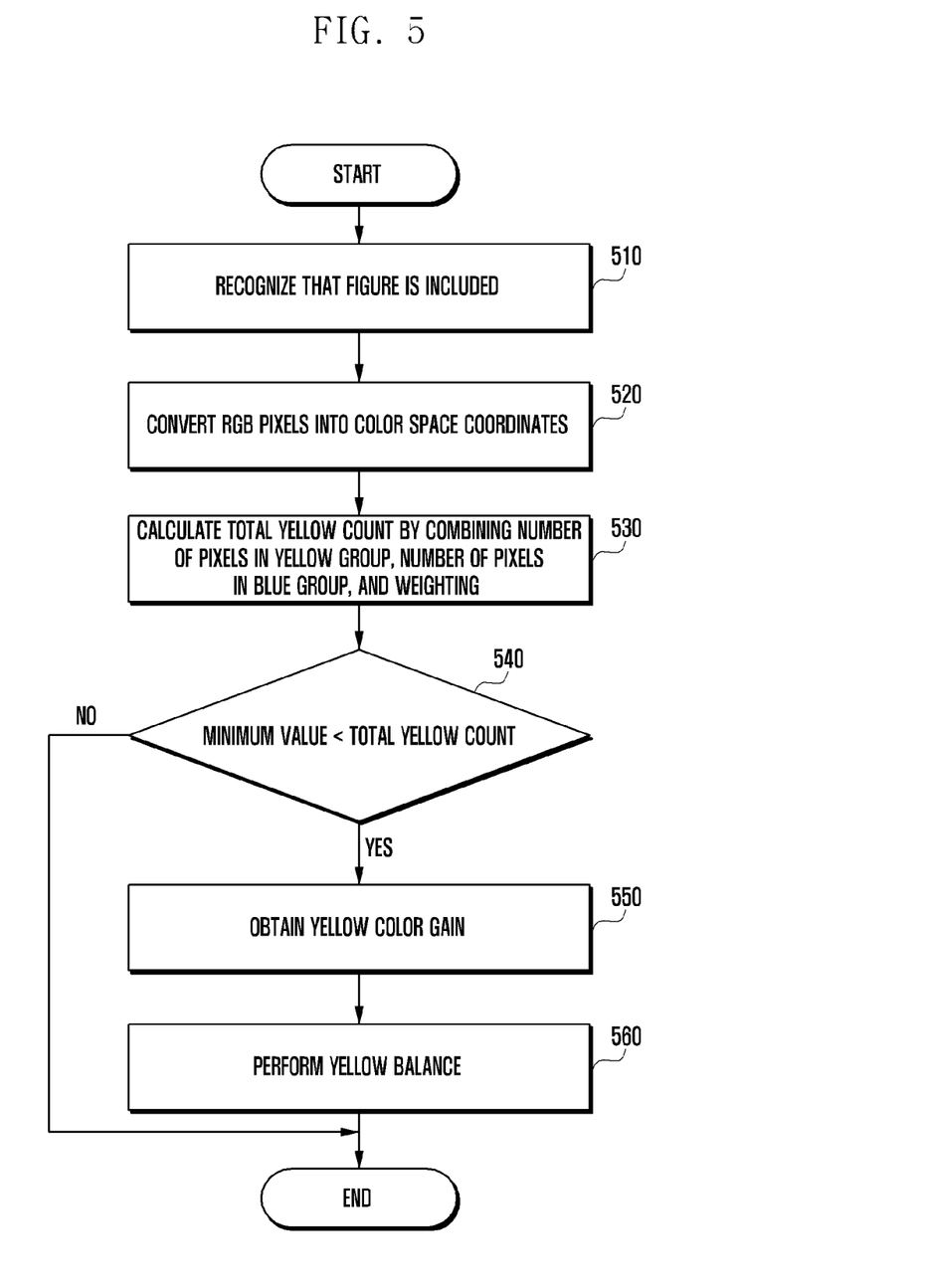
FIG. 5 illustrates an image processing method of an electronic device according to various embodiments.

FIG. 5 illustrates an image processing method of an electronic device according to various embodiments.

Referring to FIG. 5, in operation 510, a processor (e.g., the processor 120 of FIG. 1, the image signal processor 260 of FIG. 2, or the image signal processor 310 of FIG. 3) according to various embodiments may recognize that a figure is included in an image. For example, operation 510 may be an operation after performing white balance on the image received from the image sensor in operation 410 of FIG. 4 and recognizing whether a figure is included in the image adjusted by the white balance in operation 420.

In operation 520, the processor may convert RGB values of each pixel in the image including the figure into color space coordinate information. The color space coordinate information may be information based on at least one of coordinates of an HSL color space in which H denotes hue, S denotes saturation, and L denotes lightness, coordinates of a XYZ color space in which a color is represented by three-dimensional coordinates, and coordinates of a YUV color space in which a Y-axis denotes a luma component and a color is represented using U- and V-axes.

In operation 530, the processor may extract pixels included in a yellow group and pixels included in a blue group from color space coordinates based on the converted color space coordinate information about each pixel. The processor may calculate a total yellow count using Equation 1 in which the number of pixels in the yellow group, the number of pixels in the blue group, and a weighting according to saturation are combined.

$$\text{TOTAL YELLOW COUNT} = (\text{Cell}_{yellow}\ 1 * \text{weighting}_{yellow}\ 1 + \text{Cell}_{yellow}\ 2 * \text{weighting}_{yellow}\ 2 + \text{Cell}_{yellow}\ N * \text{weighting}_{yellow}\ N) - (\text{Cell}_{blue}\ 1 * \text{weighting}_{blue}\ 1 + \text{Cell}_{blue}\ 1 * \text{weighting}_{blue}\ 2 + \text{Cell}_{blue}\ N * \text{weighting}_{blue}\ N) \quad \text{Equation 1}$$

Here, $\text{Cell}_{yellow}$ denotes cells in yellow colors, $\text{weighting}_{yellow}$ denotes the saturation of a yellow color, $\text{Cell}_{blue}$ denotes cells in blue colors, and $\text{weighting}_{blue}$ denotes the saturation of a blue color.

The processor may calculate the total yellow count of the entire image by subtracting the sum of the numbers of cells and weightings in blue colors from the sum of the numbers of cells and weightings in yellow colors.

In the color space coordinates, a yellow color may be subdivided into a plurality of groups (e.g. Yellow 1, Yellow 2, Yellow 3, . . . , Yellow N) according to saturation, the lowest saturation range (e.g., the lightest yellow) may have a weighting set to 0, and the highest saturation range (e.g., the darkest yellow) may have a weighting set to 1. A blue color may also be subdivided into a plurality of groups (e.g. Blue 1, Blue 2, Blue 3, . . . , Blue N) according to saturation, the lowest saturation range (e.g., the lightest blue) may have a weighting set to 0, and the highest saturation range (e.g., the darkest blue) may have a weighting set to 1.

For example, when the color space coordinates of one cell are included in a yellow range, one yellow group may be counted, and when a weighting is classified as 0.7 in the cell according to the saturation of a yellow color, 0.7 cell in yellow colors may be counted by multiplying the one cell and the weighting of 0.7.

Figure 6:
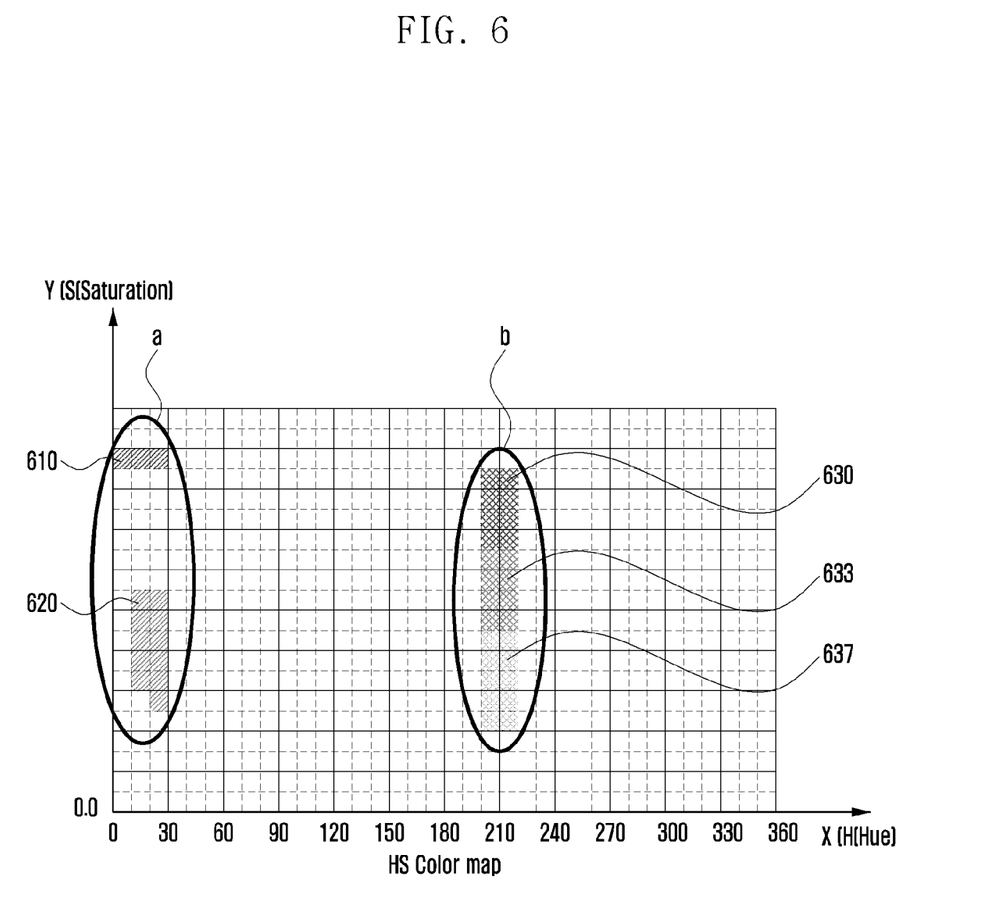
FIG. 6 illustrates a color map expressed based on color space coordinates for convenience of explanation.

FIG. 6 illustrates a color map expressed based on color space coordinates for convenience of explanation. In the color map, area a may include coordinates classified as the yellow group, and area b may include coordinates classified as the blue group. Area a and area b are arbitrarily divided for convenience of explanation, and the range of an area may vary depending on color space coordinates.

For example, regarding color space coordinate information about pixels in one image frame, pixels having coordinate information included in area a and pixels having coordinate information included in area b may be divided and may have different weightings according to saturation. Referring to FIG. 6, pixels analyzed in one image may include cells 610 of a high-saturation yellow color, cells 620 of a low-saturation yellow color, cells 637 of a high-saturation blue color, cells 635 of a medium-saturation blue color, and cells 630 of a low-saturation blue color. Although one image may include various colors of pixels, FIG. 6 shows only areas of the yellow group and the blue group for convenience of explanation.

Operation 520 and operation 530 may be part of operation 430 of FIG. 4.

In operation 540, the processor may determine whether the total yellow count is greater than a minimum threshold value.

For example, when the total yellow count is greater than the minimum threshold value, the processor may determine that the color temperature range of the image satisfies a determination range for yellow balance adjustment. Here, operation 540 may be part of operation 440 of FIG. 4.

For example, when the total yellow count is less than the minimum threshold value, the processor may not perform yellow balance because the determination range for yellow balance adjustment is not satisfied.

In operation 550, the processor may obtain a color gain for yellow balance based on the total yellow count.

According to an embodiment, the processor may convert the total yellow count into an interpolation value for a color and may then calculate a yellow color gain for adjusting individual color information based on the interpolation value.

Figure 7:
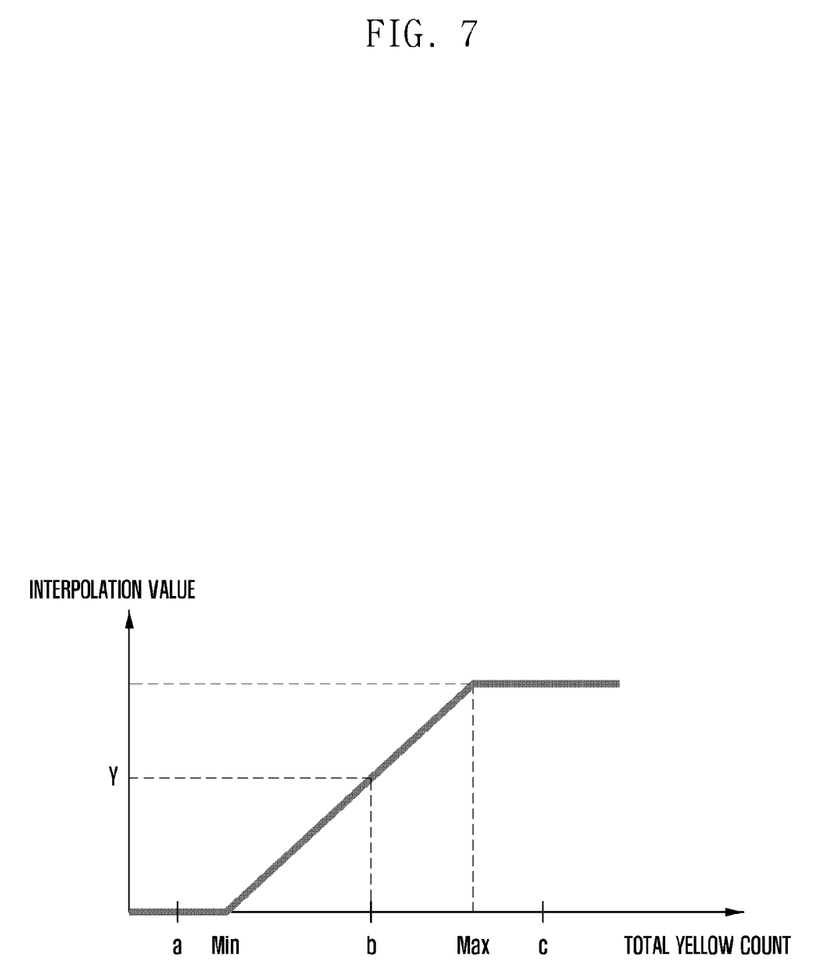
FIG. 7 is a graph illustrating an interpolation value based on a total yellow count.

For example, FIG. 7 is a graph illustrating an interpolation value based on a total yellow count. When the total yellow count is greater than the minimum threshold value, the processor may convert the total yellow count to an interpolation value. Here, the minimum threshold value may be a criterion for determining whether to perform yellow balance, and the maximum threshold value may be a criterion for determining maximum processing of yellow balance.

For example, when the total yellow count is point A, the processor may perform control not to conduct yellow balance adjustment. When the total yellow count is point B (or point C), the processor may identify an interpolation value Y corresponding to point B (or point C) and may calculate a yellow color gain for adjusting individual color information about the image based on the interpolation value Y.

When the total yellow count is point C greater than the maximum threshold value, since the total yellow count exceeds the maximum threshold value, the processor may use a yellow color gain for adjusting individual color information about the image based on an interpolation value corresponding to the maximum threshold value.

In operation 560, the processor may adjust the yellow balance of the image based on the obtained yellow balance gain.

For example, the processor may perform operation 560 when the condition that a figure is included in the image adjusted by the white balance and the condition that the color temperature of the image adjusted by the white balance falls within the determination range for yellow balance adjustment are satisfied.

In another example, even though a figure is included in the image adjusted by the white balance, when the color temperature of the image adjusted by the white balance does not fall within the determination range for yellow balance adjustment in operation 540, the processor may perform control not to conduct yellow balance adjustment. The processor may perform operation 460 of FIG. 4 after operation 560. Although not shown in the drawing, after performing the yellow balance in operation 560, the processor may adjust the contrast of the image adjusted by the yellow balance and may display the image with the adjusted contrast on a display (e.g., the display device 160 of FIG. 1) or may store the image with the adjusted contrast in a memory (e.g., the memory 130 of FIG. 1 or the memory 250 of FIG. 2).

According to an embodiment, when the yellow color gain for performing yellow balance is obtained, the processor may set the yellow color gain to be applied to an image input as a next frame.

An image processing method of an electronic device (e.g., 101 of FIG. 1) according to various embodiments may include: obtaining an image of an external object from an image sensor (e.g., the camera module 180 of FIG. 1 or the image sensor 230 of FIG. 2); adjusting the image into a first adjusted image by performing white balance on the image; identifying whether the image or the first adjusted image includes at least one figure; displaying the first adjusted image as the image of the external object on the display when identifying that the first adjusted image does not include the at least one figure; determining whether it is identified that the image or the first adjusted image includes the at least one figure and whether a color temperature of the first adjusted image satisfies a determination range for adjusting specified color balance; adjusting the first adjusted image, which includes the at least one figure and satisfies the determination range, into a second adjusted image by performing specified color balance on the first adjusted image; and displaying the second adjusted image as the image of the external object on the display.

The image processing method of the electronic device according to various embodiments may further include: storing the first adjusted image as the image of the external object in the memory when it is identified that the image or the first adjusted image does not include the figure; and storing the second adjusted image as the image of the external object in the memory when it is identified that the image or the first adjusted image includes the figure.

The determination range for adjusting the specified color balance may include a minimum threshold value as a criterion for determining whether to perform first color balance and a maximum threshold value as a criterion for determining maximum processing of the first color balance.

The range set for performing the yellow balance may fall in an average color temperature of the image ranging from 3500 to 5000 K.

Determining whether the color temperature satisfies the determination range for adjusting the specified color balance may include estimating the color temperature of the first adjusted image using average RGB values of all pixels included in the first adjusted image and a color temperature conversion algorithm.

Determining whether the color temperature satisfies the determination range for adjusting the specified color balance may include: calculating a total first color count by converting red, green, and blue (RGB) values of each pixel in the first adjusted image into color space coordinate information and subtracting a sum of a number of pixels and a weighting included in a second color range from a sum of a number of pixels and a weighting included in a first color range based on the color space coordinate information about each pixel; and estimating the color temperature of the first adjusted image based on the calculated total first color count.

Determining whether the color temperature satisfies the determination range for adjusting the specified color balance may include determining that the color temperature satisfies the determination range for adjusting the specified color balance when the total first color count is greater than the set minimum threshold value.

Adjusting into the second adjusted image may include generating the second adjusted image by converting the total first color count into an interpolation value corresponding to a first color, obtaining a gain for adjusting individual color information for performing first color balance based on the interpolation value, and performing the first color balance based on the obtained gain when the total first color count is greater than the minimum threshold value.

Adjusting into the second adjusted image may include obtaining the gain using an interpolation value corresponding to the set maximum threshold value when the total first color count is equal to or greater than the maximum threshold value.

The first color range may be set to a range of yellow colors, the second color range may be set to a range of blue colors, and the weighting may vary depending on a saturation of a color.

The image processing method of the electronic device may further include performing contrast adjustment on the first adjusted image or performing contrast adjustment on the second adjusted image resulting from the specified color balance when the image or the first adjusted image does not include the figure or when the image or the first adjusted image includes the figure and the color temperature of the first adjusted image does not fall in the determination range.

Figure 8:
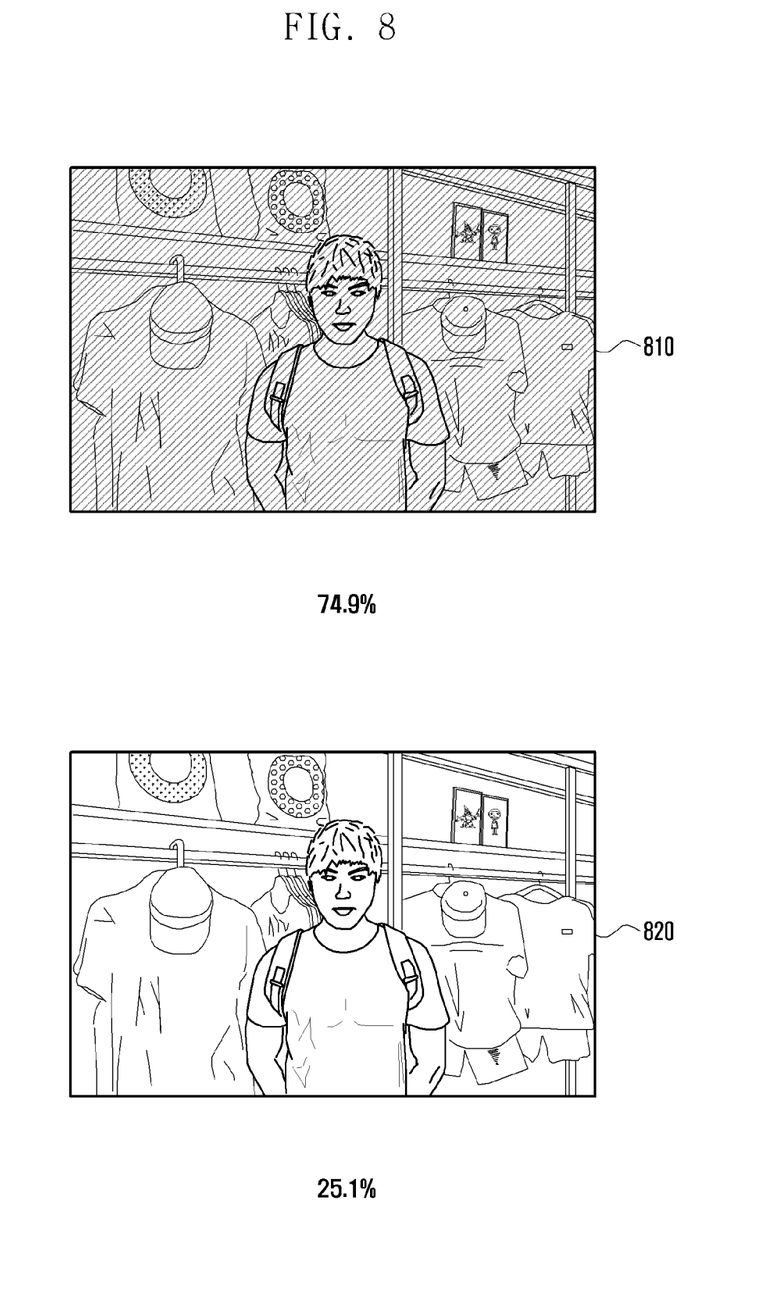
FIG. 8 illustrates an example of improving the quality of an image according to an embodiment.

FIG. 8 illustrates an example of improving the quality of an image according to an embodiment.

Referring to FIG. 8, according to various embodiments, comparing an image with white balance adjusted and an image with yellow balance adjusted, a yellow tone effect may be increased.

For example, the image adjusted by yellow balance may have a yellow effect increased to 74.9% as illustrated by 810, while the image adjusted by white balance may have a yellow effect of 25.1% as indicated by 820. When a figure is included in the image adjusted by the white balance, the figure may be perceived with a slightly cold feeling from the perspective of a user due to the reduced yellow effect. However, when a figure is included in the image adjusted by the yellow image, the figure may be perceived with a warm feeling due to the yellow effect from the perspective of the user, thus increasing the user's satisfaction.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. An electronic device comprising:
an image sensor;
a display; and
a processor configured to be electrically connected to the image sensor and the display,
wherein the processor is configured to:
obtain an image of an external object using the image sensor;
generate a first adjusted image by performing white balance on the image;
identify whether the first adjusted image comprises at least one face figure;
display the first adjusted image as the image of the external object on the display when identifying that the first adjusted image does not comprise the at least one face figure;
determine a color temperature of the first adjusted image based on average RGB values of all pixels in the first adjusted image when identifying that the first adjusted image comprises the at least one face figure; and
generate a second adjusted image by performing specified color balance on the first adjusted image and display the generated second adjusted image as the image of the external object on the display when identifying that the determined color temperature of the first adjusted image satisfies a determination range for adjusting the specified color balance.

2. The electronic device as claimed in claim 1, further comprising a memory,
wherein the processor is configured to store the generated first adjusted image as the image of the external object in the memory when it is identified that the first adjusted image does not comprise the at least one face figure, and to store the generated second adjusted image as the image of the external object in the memory when it is identified that the first adjusted image comprises the at least one face figure.

3. The electronic device as claimed in claim 1, wherein the determination range for adjusting the specified color balance comprises a range set for performing yellow balance, and
wherein the processor is configured to perform the yellow balance as at least part of performing the specified color balance.

4. The electronic device as claimed in claim 3, wherein the range set for performing the yellow balance falls in an average color temperature of the image ranging from 3500 to 5000 K.

5. The electronic device as claimed in claim 3, wherein the processor is configured to:
as operating of determining the color temperature of the first adjusted image, calculate a total first color count by converting red, green, and blue (RGB) values of each pixel in the first adjusted image into color space coordinate information and subtracting a sum of a number of pixels and a weighting comprised in a second color range from a sum of a number of pixels and a weighting comprised in a first color range based on the color space coordinate information about each pixel; and
determine the color temperature of the first adjusted image based on the calculated total first color count.

6. The electronic device as claimed in claim 5, wherein, when the total first color count is greater than a minimum threshold value as a criterion for determining whether to perform first color balance, the processor is configured to perform the specified color balance on the first adjusted image.

7. The electronic device as claimed in claim 6, wherein the processor is configured to:
as operating of generating a second adjusted image by performing the specified color balance on the first adjusted image,
generate the second adjusted image by converting the total first color count into an interpolation value corresponding to a first color, obtaining a gain for adjusting individual color information for performing first color balance based on the interpolation value, and performing the first color balance based on the obtained gain when the total first color count is greater than the minimum threshold value; and
obtain the gain using an interpolation value corresponding to a maximum threshold value as a criterion for determining maximum processing of the first color balance when the total first color count is equal to or greater than the maximum threshold value.

8. The electronic device as claimed in claim 5, wherein the first color range is set to a range of yellow colors, the second color range is set to a range of blue colors, and the weighting varies depending on a saturation of a color.

9. The electronic device as claimed in claim 1, wherein, when the first adjusted image does not comprise the at least one face figure or when the first adjusted image comprises the at least one face figure and the color temperature of the first adjusted image does not fall in the determination range, the processor is configured to perform contrast adjustment on the first adjusted image.

10. The electronic device as claimed in claim 1, wherein the processor is an image signal processor.

* * * * *